United States Patent [19]

Tritenne

[11] 4,218,931
[45] Aug. 26, 1980

[54] BICYCLE CRANK UNIT

[76] Inventor: Claude Tritenne, Les Morenes, Thoiry (Ain), France

[21] Appl. No.: 870,094

[22] Filed: Jan. 17, 1978

[30] Foreign Application Priority Data

Jan. 20, 1977 [FR] France .......................... 77 02218

[51] Int. Cl.² .............................................. F16H 9/00
[52] U.S. Cl. ...................................... 474/165; 474/160
[58] Field of Search ............... 74/594.2, 217 B, 640, 74/243 NC, 243 PC, 242.16, 242.11 E, 217 R

[56] References Cited

U.S. PATENT DOCUMENTS

| 453,705 | 6/1943 | Lapeyre | 74/217 B |
|---|---|---|---|
| 542,882 | 7/1895 | Fisher | 74/640 |
| 591,488 | 10/1897 | McMullin | 74/217 B X |
| 1,523,676 | 1/1925 | Trussell | 74/242.16 |
| 2,187,368 | 1/1940 | Todrys | 74/217 B |
| 3,347,112 | 10/1967 | Thun | 74/594.2 |
| 3,919,898 | 11/1975 | Sugino | 74/594.2 |

FOREIGN PATENT DOCUMENTS

| 521644 | 8/1953 | Belgium | 74/242.16 |
|---|---|---|---|
| 90237 | 4/1896 | Fed. Rep. of Germany | 74/217 B |
| 451562 | 4/1913 | France | 74/217 B |
| 562195 | 5/1957 | Italy | 74/594.2 |
| 55921 | 11/1935 | Sweden | 74/217 B |
| 1812 | of 1882 | United Kingdom | 74/217 B |

*Primary Examiner*—Samuel Scott
*Assistant Examiner*—Randall L. Green
*Attorney, Agent, or Firm*—Karl F. Ross

[57] ABSTRACT

The invention provides a bicycle crank unit in which the chain wheel or chain wheels are eccentric with respect to the crank spindle and the crank spindle carries an externally toothed pinion to engage within an internal gear carried coaxially by the chain wheel. This provides a step down gearing between the pedal crank arms and chain wheel and enhances the mechanical advantage of the drive transmission.

2 Claims, 4 Drawing Figures

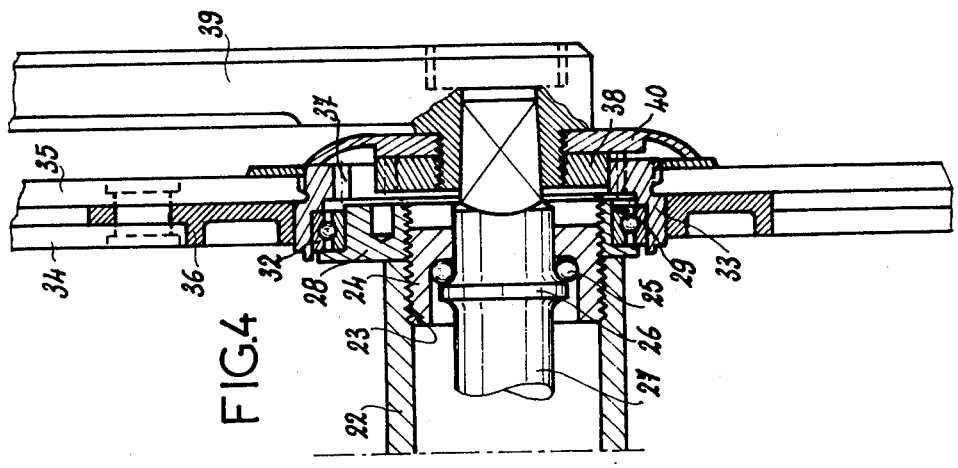
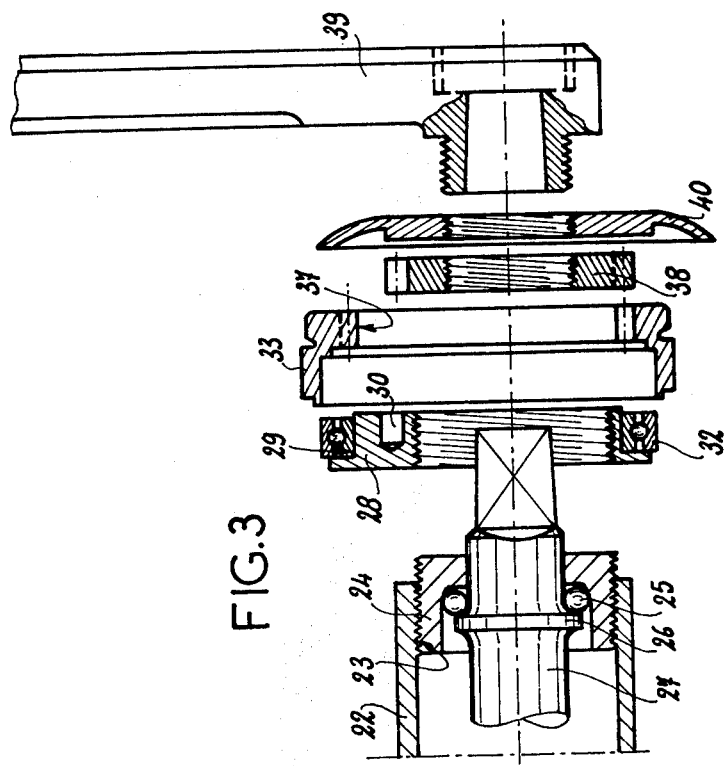

BICYCLE CRANK UNIT

FIELD OF THE INVENTION

The present invention relates to a bicycle crank unit.

BACKGROUND OF THE INVENTION

Conventionally, the cyclist exerts a force on pedals which are rotatably mounted at the remote ends of cranks, the near or inner ends of the cranks being associated with a horizontal crank spindle which is itself rotatably mounted in the crank case of the bicycle frame.

One or two externally toothed chain wheels (sprockets) are fixed on the rotatable axle in the crank case, one of which engages with the drive chain which is also engaged with a sprocket fixed on the hub of the rear wheel which, as is known, additionally comprises a free-wheeling clutch. Most frequently, two chain wheels of different diameters are provided on the crank spindle, and five sprockets of different diameters are provided on the rear wheel.

The various combinations of the two chain wheels with the five rear sprockets make it possible to obtain ten different speed ratios for utilizing the effort produced by the rider. Selecting the large chain wheel with a small sprocket gives a high speed ratio, applying a relatively low torque to the rear wheel. Alternatively, selecting the small chain wheel with a large sprocket produces a low speed ratio and hence a larger torque on the rear wheel.

OBJECT OF THE INVENTION

It is an object of the present invention to provide a new crank unit which modifies the mechanical advantage of the transmission for the driving power produced by the rider.

SUMMARY OF THE INVENTION

Accordingly the present invention provides a bicycle crank unit wherein an externally toothed pinion is fixed on the rotatable crank spindle, and engages an internally toothed wheel, which wheel has a number of internal teeth greater than that of said pinion and is mounted so as to rotate relative to the bicycle frame about a horizontal axis which is parallel to but different from that of the said pinion, and wherein said internally toothed wheel carries the conventional externally toothed chain-wheel discs which engage with the drive chain in order to drive the rear wheel.

This achieves a gear reduction in the crank unit; i.e. for a given ratio of the number of teeth on a front disc to the number of teeth on a rear pinion, the distance travelled during one turn of the pedals is less than that covered with the conventional crank unit. On the other hand, the torque thus produced on the rear wheel is distinctly greater than in the conventional case.

In order that the present invention may more readily be understood the following description is given with reference to the accompanying drawing in which:

FIG. 3 is an exploded cross-sectional view of a second embodiment of crank unit; and FIG. 4 is a cross-sectional view of the crank unit of FIG. 3, but when in the assembled position, again taken on a plane of section passing through the axis of rotation of the crank spindle.

SPECIFIC DESCRIPTION

Figure 2:
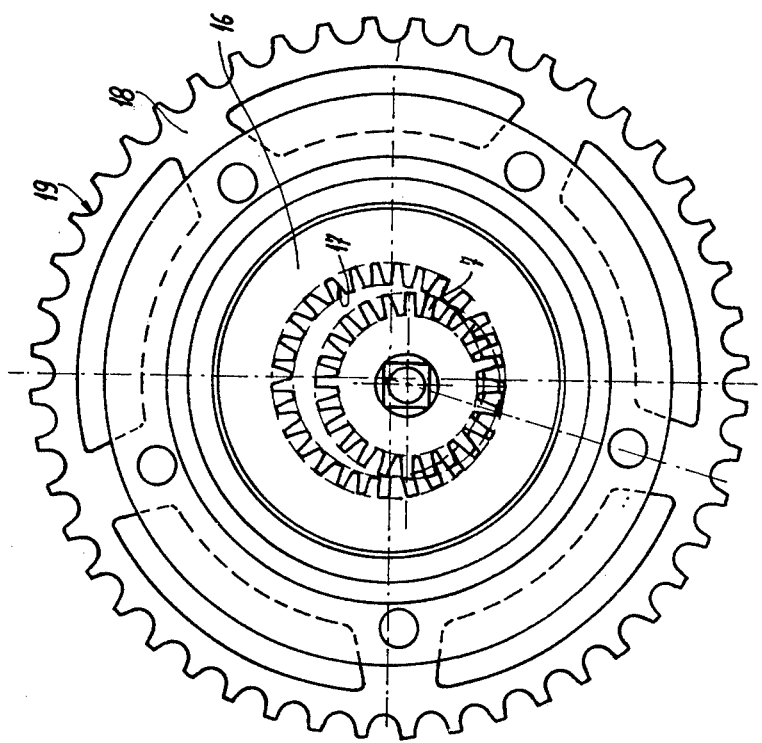
FIG. 2 is a side elevational view of the essential elements of this crank unit.
Figure 1:
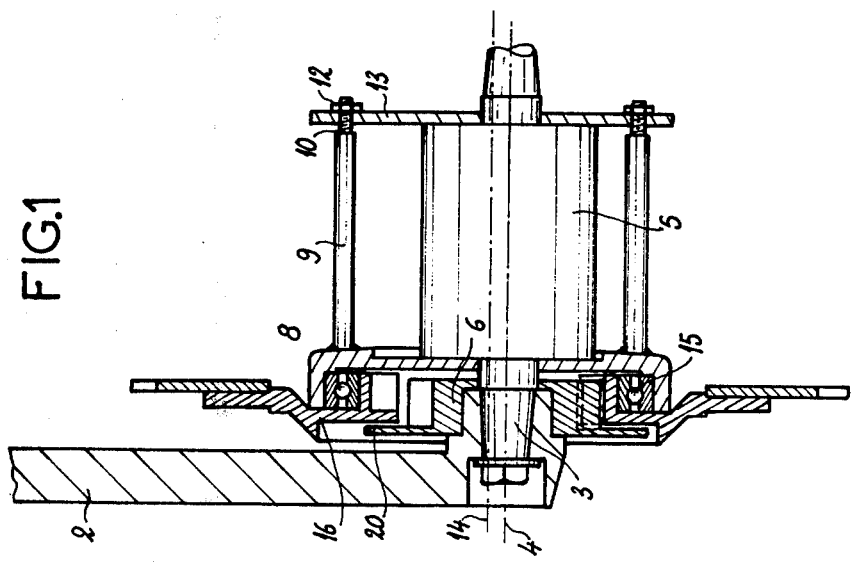
FIG. 1 is a cross-sectional view of a first crank unit, on a plane which passes through the axis of the crank spindle.

In the embodiment shown in FIGS. 1 and 2, this crank unit conventionally comprises cranks 2 fixed on a crank spindle 3 which is mounted so as to swivel about a horizontal axis 4 in the casing 5. A pinion 6 having external teeth 7, is fixed on the crank spindle 3.

A circular dish 8 is fixed on the crank spindle casing of the bicycle frame, and the concave side of this dish faces outwards, that is to say towards the crank 2. In the embodiment shown in the drawing, this dish 8 has tie rods 9 firmly fixed to its convex face, the ends of these tie rods being screw threaded at 10. The screw threads make it possible to fix nuts 12 on the tie rods 9 for providing support to fix the dish 8 to a back plate 13 which will itself abut the other side of the crank casing 5 of the bicycle frame. This dish 8 is mounted on the casing 5 of the crank spindle 3 such that its axis 14 (which coincides with the axis of the chain wheel) is eccentric relative to the axis 4 of the crank spindle.

In the embodiment shown in FIGS. 1 and 2, the eccentricity of the axes of spindle 3 and the chain wheel is such that the axis 4 is situated behind and below the axis 14 as shown in FIG. 2.

A side-plate 16, both carries the externally toothed chain wheel disc 18 and has a wheel-shaped part having an internal gear 17 whose teeth engage with the external teeth 7 of the pinion 6. This side-plate 16 is mounted inside the dish 8 with a ball bearing 15 placed between the pinion 6 and dish 8.

It should be noted that the number of teeth of the internal gear 17 is greater than the number of external teeth 7 on the small pinion 6. At least one chain wheel disc 18 is fixed in a known manner on the side-plate 16, the chain wheel disc or discs having external teeth 19 which are suitable for engaging with a drive chain (not shown in the drawing) transmitting the pedal movement to the rear wheel.

On the outer face of the small pinion 6 fixed on the crank spindle 3, is an extension formed by a radial skirt 20 which partially covers the outer face of the side-plate 16, in order both to prevent the side-plate from accidentally flying off and to serve as a guard to reduce the chances of contamination of the internal and external gear teeth 17 and 7.

For a given ratio of teeth on the chain wheel disc 18 to the teeth on a rear wheel sprocket (not shown in the drawing) the gearing, that is to say the road distance travelled by the cyclist for one turn of the pedals, is reduced in the ratio of the number of external teeth 7 to the number of internal teeth 17. Furthermore, the torque produced on the rear wheel is very substantially increased, which makes pedalling easier for the rider and increases his or her performance.

FIGS. 3 and 4 show a different embodiment of this crank unit. The crank casing 22 is tapped with a thread 23, inside which the open end of a dish 24 is screwed. This dish is used to support balls 25 which are also supported by a rounded shoulder 26 of the crank spindle 27.

As shown in particular in FIG. 3, the dish 24 projects axially outwardly beyond the crank casing. A flat locking nut 28 is screwed on this projecting part of the dish 24 and (as shown in FIGS. 3 and 4) an external projection 29 which is eccentric relative to the crank casing 22. The nut 28 is locked in the desired position using conventional tools which can be engaged in the cut-outs 30 of the nut 28. A ball bearing 32, on which a ring 33 is engaged as a force fit, is mounted on the external projection 29 of the nut 28. This ring 33 is used to support chain wheel discs 34 and 35, by means of a carrier 36.

The ring 33 has a portion which projects axially outwardly relative to the nut 28 to form an internally toothed gear 37. An externally toothed pinion 38, the number of teeth on which is less than that on the internal gear 37, is fixed on the crank spindle 27. In the assembled position of the unit, shown in FIG. 4, the pinion 38 engages with the teeth on internal gear 37.

A protection and sealing cup 40 carried by the associated crank arm 39 is provided between the pinion 38 and the crank arm 39, this cup being mounted on the crank arm removably or fixedly, so as to rotate with the crank arm 39 and the pinion 38.

I claim:

1. In a bicycle crank unit comprising a crank spindle, two diametrically opposed pedal cranks, one mounted on each end of said crank spindle and chain wheel means driven by said crank spindle and rotatable about a horizontal axis of symmetry of a crank casing of a bicycle frame, the improvement wherein:
   an externally toothed pinion is fixed on the rotatable crank spindle, and, an internally toothed wheel is fastened to said chain wheel means and positioned in meshing engagement with said externally toothed pinion, said internally toothed wheel having a number of teeth greater than that of said pinion and being mounted for rotation relative to said horizontal axis which is parallel to but different from that of the said pinion, said chain wheel means and said crank spindle have their axes of rotation parallel but non-coincident;
   a circular dish having a concave and a convex side is mounted on said crank casing of the bicycle frame so as to be eccentric relative to said axis of symmetry of the crank casing and to have its concave side facing outwards away from the crank casing;
   a side-plate is associated with said concave side;
   a ball bearing is disposed between said side-plate and said concave side of said dish thereby mounting said dish rotatably on said side-plate; said side-plate having an internally toothed portion forming said internally toothed wheel, tie rods having screw-threaded free ends are provided, said tie rods being fixed on the convex side of said dish;
   nuts are threaded on said free ends of said tie rods and a back-plate abuts the other side of the crank casing, said free ends of said tie rods extending through said backplatefor thereby fixing said dish onto said crank casing.

2. A crank unit according to claim 1, wherein said pinion includes, on its end which lies further from the crank casing, a radially outwardly extending skirt which partially covers said internally toothed wheel.

* * * * *